(12) United States Patent
Raikin et al.

(10) Patent No.: US 7,975,129 B2
(45) Date of Patent: *Jul. 5, 2011

(54) SELECTIVE HARDWARE LOCK DISABLING

(75) Inventors: Shlomo Raikin, Haifa (IL); Gad Sheaffer, Haifa (IL); Doron Orenstlen, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/562,457

(22) Filed: Sep. 18, 2009

(65) Prior Publication Data
US 2010/0011193 A1 Jan. 14, 2010

Related U.S. Application Data

(63) Continuation of application No. 11/710,028, filed on Feb. 23, 2007, now Pat. No. 7,613,908.

(51) Int. Cl.
*G06F 9/312* (2006.01)
(52) U.S. Cl. ........................ 712/220; 712/225
(58) Field of Classification Search ........................ None
See application file for complete search history.

(56) References Cited

U.S. PATENT DOCUMENTS

| 5,428,761 | A | * | 6/1995 | Herlihy et al. ................. 711/130 |
| 5,721,855 | A | | 2/1998 | Hinton et al. ................. 712/218 |
| 6,862,664 | B2 | | 3/2005 | Tremblay et al. ............. 711/137 |
| 7,120,762 | B2 | * | 10/2006 | Rajwar et al. ................. 711/150 |
| 2002/0124156 | A1 | * | 9/2002 | Yoaz et al. .................... 712/225 |
| 2002/0178349 | A1 | * | 11/2002 | Shibayama et al. .......... 712/235 |

OTHER PUBLICATIONS

Rajwar, Ravi , Speculation-Based Techniques for Transactional Lock-Free Execution of Lock Based Programs, 2002, Univerisity of Wisconsin-Madison, 224 pages.*
Martinez, Jose F. etal., Speculative Synchronization: Applying Thread-Level Speculation to Explicitly Parallel Applications, 2002, ACM, pp. 18-29.*
Rajwar, R. etal. Speculative Lock Elision: Enabling Highly Concurrent Multithreaded Execution, 2001, IEEE, pp. 294-305.
Rajwar & Goodman, Speculative Lock Elision: Enabling Highly Concurrent Multithreaded Execution, Dec. 3-5, 2001, 34th International Symposium on Microarchitecture, Austin Texas.

* cited by examiner

*Primary Examiner* — Eric Coleman
(74) *Attorney, Agent, or Firm* — Trop, Pruner & Hu, P.C.

(57) ABSTRACT

Controlling a reorder buffer (ROB) to selectively perform functional hardware lock disabling (HLD) is described. One apparatus embodiment includes a unit to enable an ROB to selectively disable a lock upon Identifying a lock acquire operation (LAO) associated with a critical section (CS) entry point, a unit to selectively retire the LAO, a unit to cause the ROB to selectively disable the lock, and a unit to snoop a buffer. The apparatus may, based on the snooping, selectively abort a transaction associated with the CS.

11 Claims, 4 Drawing Sheets

SELECTIVE HARDWARE LOCK DISABLING

This application is a continuation of U.S. patent application Ser. No. 11/710,028, filed Feb. 23, 2007 now U.S. Pat. No. 7,613,908, entitled "SELECTIVE HARDWARE LOCK DISABLING," the content of which is hereby incorporated by reference.

TECHNICAL FIELD

Embodiments of the invention relate to the field of microprocessors and computer systems. More particularly, at least one embodiment of the invention relates to an apparatus to control a reorder buffer in a pipelined processor architecture to selectively disable a lock whose protection is not needed.

BACKGROUND

Bottlenecks may exist in conventional multithreaded programs. The bottlenecks may arise due to serialization of parallel threads for critical sections. Threads may become serialized due to locks that programmers use to protect data. However, the locking convention may introduce errors or produce deadlock scenarios. In some cases, serialization may not be necessary if no data collision actually occurs within the critical section. Therefore, it is possible for some critical sections that do not have inter-thread dependencies to execute concurrently without locks. Unfortunately, conventional processors lack mechanisms to dynamically ignore false inter-thread dependencies.

Previous attempts at speculative lock elision have been made. However, these were attempts at general purpose elision where the critical section (CS) could be of any length. Therefore, a speculative versioning cache and register checkpoint were employed to allow for an arbitrarily long CS. However, analysis of CS length reveals that many CS consume fewer instructions than are available in a reorder buffer (ROB) and fewer cycles than are incurred in cache operations associated with acquiring a lock. In particular, ping-ponging addresses back and forth between caches may consume more processor cycles than exist in an entire CS.

BRIEF DESCRIPTION OF THE DRAWINGS

The accompanying drawings, which are incorporated in and constitute a part of the specification, illustrate various example systems, methods, and other embodiments of various aspects of the invention. It will be appreciated that the illustrated element boundaries (e.g., boxes, groups of boxes, or other shapes) in the figures represent one example of the boundaries. One of ordinary skill in the art will appreciate that in some embodiments one element may be designed as multiple elements, multiple elements may be designed as one element, an element shown as an Internal component of another element may be implemented as an external component and vice versa, and so on. Furthermore, elements may not be drawn to scale.

DETAILED DESCRIPTION

One embodiment of the invention facilitates causing a reorder buffer (ROB) to perform lock disabling without using a speculative versioning cache and without using a checkpoint register. In one embodiment, actions that facilitate controlling the ROB to disable locks are performed while a transaction Is active. A transaction may be defined as the set of operations protected by a lock and that occur between a lock acquire and lock release. A lock may be defined as a memory location that stores a value that can be analyzed and manipulated to control access to a critical section. A critical section may be defined as a set of executable instructions that may access a shared resource (e.g., memory location) that should not be accessed by more than one thread of execution in a parallel processing environment.

One embodiment of the invention employs internal buffers in a processor to perform hardware lock disabling (HLD). HLD may mitigate bottlenecks created when programmers use locks to protect a critical section of a program. As described above, these bottlenecks may occur unnecessarily. In one embodiment of the invention, some locks can be functionally disabled when it is determined that no data collision occurred in an area protected by a lock, the "critical section" (CS). By disabling a lock, the operations that surround CS execution (e.g. acquiring the lock and releasing the lock) may not effect the cache of the processor on which the operations would have occurred and also may not have an effect on other processor caches interacting with the lock. Thus, HLD dynamically removes unnecessary lock-induced serialization to facilitate concurrent multithreaded execution.

Figure 1:
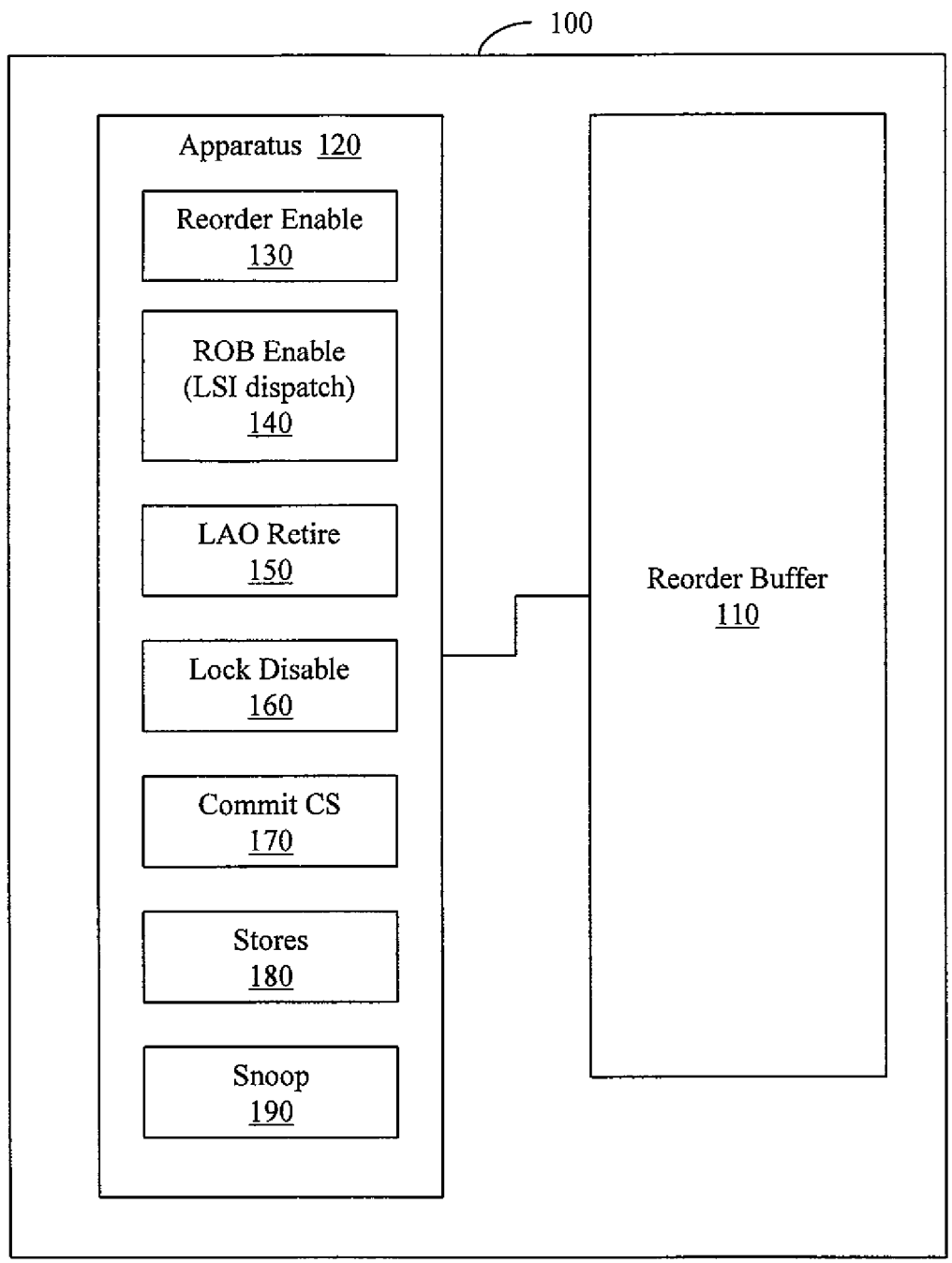
FIG. 1 illustrates an organization of processing logic in which at least some aspects of at least one embodiment of the invention may be performed.

FIG. 1 illustrates an apparatus 120 for causing an ROB 110 in a processor 100 having a pipelined architecture to perform HLD. The apparatus 120 may have several units that control the ROB 110 to perform the HLD. However, neither apparatus 120 nor ROB 110 will employ a speculative versioning cache to perform HLD. Also, neither apparatus 120 nor ROB 110 will employ a register checkpoint to perform HLD. While apparatus 120 is illustrated outside ROB 110, in one embodiment apparatus 120 may be incorporated into ROB 110. (See, FIG. 2) Additionally, while apparatus 120 is illustrated with seven separate units, it is to be appreciated that a greater and/or lesser number of units may perform the functions described. (See, FIG. 3)

The apparatus 120 may include a first unit 130 to enable the ROB 110 to selectively disable a lock. The first unit 130 may enable the ROB upon identifying a lock acquire operation (LAO) associated with a CS entry point. In one embodiment the LAO may be a load and store intent (LSI) operation. The LSI may be a test and set operation, a test and test and set operation, and so on. The LSI may be converted to a normal load so that no read for ownership (RFO) occurs for the LSI.

Dynamic functional HLD may be performed because instructions may live longer than one moment in some pipelined microprocessors. In microprocessors with long pipelines, instructions associated with a lock acquire operation may live long enough so that instructions associated with a related lock release operation that have begun their journey through the pipeline can be detected. Thus, it may be possible to "ignore" instructions associated with both these operations if it can be determined that there has been no collision on a data location protected by the lock acquire and release instructions. When critical sections are short enough that the lock release store is dispatched before the lock acquire store retires, both stores can be ignored (e.g., not retired). Thus, neither instruction will cause an actual write to cache memory and cache memory in other processors that may share the lock associated with the lock release/acquire stores will not have their copy invalidated. When it is understood that cache to cache transfer latency may be on the order of hundreds, thousands or more processor cycles, then it can be understood that a certain percentage of critical sections will consume less than that number of cycles and, in some cases, may even fit entirely in an ROB.

Enabling the ROB 110 may occur upon predicting that the LSI is the CS entry point. Whether the ROB 110 is enabled may also depend on whether an HLD prediction flag indicates that this LSI is a candidate for being disabled. As used herein, "flag" refers to a logical entity that may be implemented in different physical manners. A flag may store a value that is examined to determine whether to take an action. A flag may be physically stored in locations including, in a memory location, in a cache memory location, in a register, in one or more bits of a register, and so on. Enabling the ROB 110 may include marking the LSI as a predicted CS entry point. Marking the LSI may include manipulating a bit associated with the LSI in the pipelined architecture. Enabling the ROB 110 may also include setting a transaction active flag to indicate that a transaction to be performed in the CS is active. Enabling the ROB 110 may also include selectively setting an HLD flag to indicate that lock disabling is in progress. In one embodiment, the first unit 130 sets the HLD flag to indicate that lock disabling is in progress upon determining that an HLD prediction flag associated with the LSI holds a value that indicates that the lock can likely be disabled.

Apparatus 120 may also include a second unit 140 that further enables the ROB 110 to selectively disable a lock. This further enabling may occur when the LSI is dispatched. This further enabling may include preventing the LSI from issuing an RFO. This further enabling of the ROB 110 may also include storing an address associated with the LAO and storing a value (e.g., data) associated with the LAO. A store instruction may be decoded into a store address micro-operation (STA) and into a store data micro-operation (STD). Thus, the STA address may be stored in a first register and the STD data may be stored in a second register. The STA address may be compared later to the address associated with store instructions received while a transaction is in progress.

The apparatus 120 may detect that the lock acquire instruction predicted to be the beginning of a CS is reaching retirement. Upon detecting that the lock acquire instruction is ready for retirement, the apparatus 120 will determine whether the corresponding store instruction for releasing the lock has already been dispatched. If so, then the apparatus 120 will stall retirement of the lock acquire instruction until CS memory accesses are complete and all related transactional instructions are ready for retirement. The apparatus 120 will then perform a bulk retirement of CS instructions without retiring either the lock acquire store or the lock release store. Thus, it will be as if these two stores never occurred. If, however, the lock release store was not yet dispatched, then the lock acquire instruction will be retired normally. In one embodiment, a counter (e.g., register) can be added to control the number of micro-operations (uops) for which the lock acquire instruction will wait before retiring.

The apparatus 120 may also include a third unit 150 to selectively retire the LAO. To retire an instruction may include causing results located inside the ROB 110 and/or processor 100 to be propagated outside the ROB 110 and/or processor 100. To retire an instruction may also include causing results associated with an instruction to be retired to be written to a different architectural area of the processor 100. In one embodiment, the third unit 150 is to cause the ROB 110 to retire the LSI upon determining that the LSI is ready to retire and that no lock release instruction (LRI) related to the LSI has been dispatched.

The apparatus 120 may also include a fourth unit 160 to cause the ROB 110 to selectively disable the lock. Selectively disabling the lock may include performing a set of actions in a certain order. In one embodiment, the fourth unit 160 may first cause the ROB 110 to not retire the LSI and to not retire the LRI. Then the fourth unit 160 may cause the ROB 110 to selectively stall retirement of instructions in the CS until it can be determined that the LSI is ready to retire, that instructions in the CS are ready to retire, that memory accesses associated with instructions in the CS are completed, and that an LRI related to the LSI has been dispatched. The fourth unit 160 may then cause the ROB 110 to bulk retire instructions in the CS without retiring the LSI or the LRI. Apparatus 120 may also include a fifth unit 170 to selectively cause the ROB 110 to commit the CS instructions. In one embodiment, the fourth unit 160 may cause interrupts to be blocked and may cause external snoops to be deferred while the bulk retiring is occurring. The fourth unit 160 may also cause interrupts to be blocked and external snoops to be blocked while Instructions are being committed.

In one example, the fourth unit 160 may manipulate and monitor a counter. The counter may store a number of operations for which the LSI has been waiting to see a related LRI be dispatched. The fourth unit 160 may, upon determining that a pre-determined number of operations has occurred, cause the ROB 110 to retire the LSI.

The apparatus 120 may also include a sixth unit 180 to identify a store instruction whose store address matches the address associated with the LAO. The sixth unit 180 may set an address match flag to indicate that a matching store address has been encountered. The address match flag may be set upon determining that a store instruction has been encountered while the transaction active flag indicates that a transaction is active. The address match flag may be set when an STA address associated with the store instruction matches the STA address associated with the LSI. The sixth unit may issue an RFO associated with the store instruction upon determining that the store Instruction is experiencing its first dispatch from a uop buffer (MOB) in the processor 100.

The apparatus 120 may also include a seventh unit 190 to snoop a buffer. In one example, the seventh unit 190 may snoop a load buffer and may snoop a store buffer and may, based on the snooping, cause a transaction associated with the CS to be aborted.

Acquiring a lock typically involves testing a lock value and if the lock is free writing a value to the lock. The test and set may be incorporated in a load_store_intent (LSI) instruction. The set may be decoded into two micro-operations (uop), a store address uop (STA) and a store data uop (STD). The store associated with the LSI conventionally will invalidate the lock value in other processors and caches interacting with the lock. Recall that processors interact with caches and that caches have coherency protocols to facilitate having caches know when they are In agreement with other (e.g., consistent) and when they disagree. When a first processor lock acquire operation causes a cache write, as would occur with an LSI store, other caches would be invalidated, forcing those caches to snoop and thus consume processor cycles. A lock stored in one cache may require snooping of the look in all related caches, once again consuming processor cycles. Apparatus 120 can prevent these cache invalidations since an entire CS may be executed without the need to acquire and release a lock, thus not requiring altering the value of the lock in the caches and in main memory.

Figure 2:
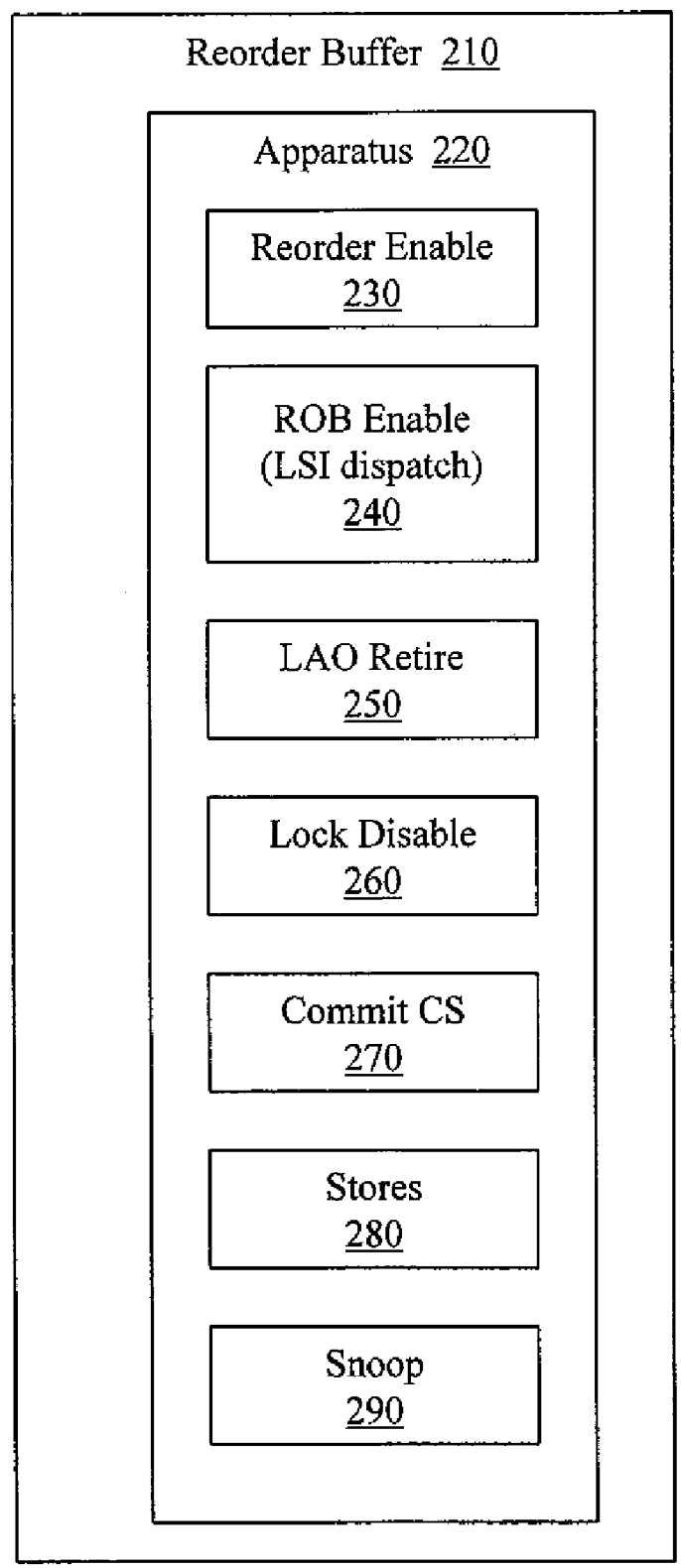
FIG. 2 illustrates an organization of processing logic in which at least some aspects of at least one embodiment of the invention may be performed, the organization forming an apparatus for causing a reorder buffer (ROB) to perform hardware lock disabling (HLD).

FIG. 2 illustrates an apparatus 220 that has been incorporated into a reorder buffer 210. Apparatus 220 may control reorder buffer 210 to selectively perform HLD. Thus, apparatus 220 may include elements similar to those described in connection with apparatus 120. For example, apparatus 220 includes a first unit 230 to enable the ROB 210 to do HLD and a second unit 240 to further enable the ROB 210 to do HLD. Similarly, apparatus 220 includes a third unit 250 to selectively retire an LAO, a fourth unit 260 to selectively disable a lock, and a fifth unit 270 to selectively commit CS instructions. Apparatus 220 may also include a sixth unit 280 to handle the processing of stores that occur while a transaction is active and HLD is being attempted and a seventh unit 290 to handle snooping while a transaction is active and HLD is being attempted.

Figure 3:
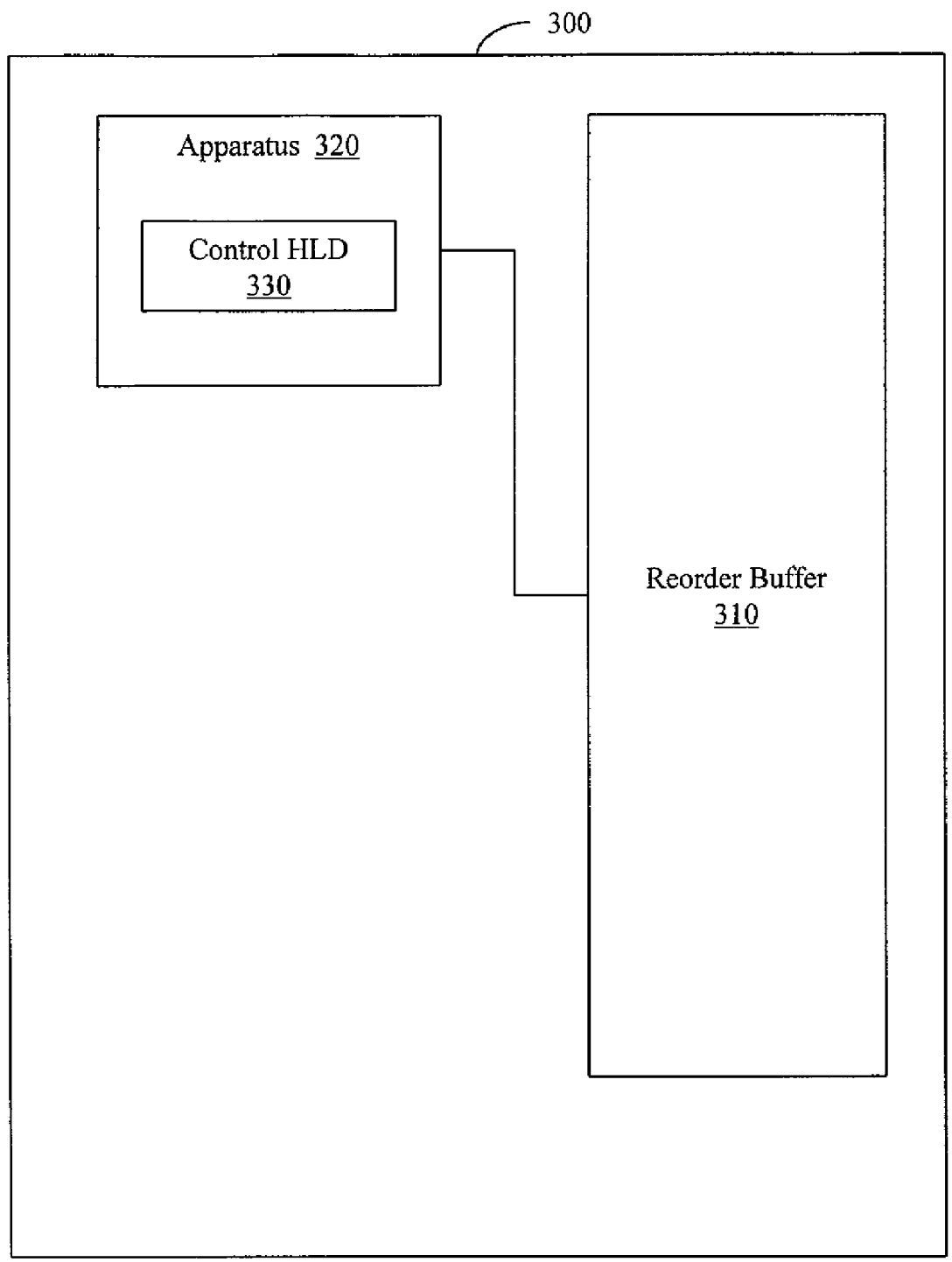
FIG. 3 illustrates an organization of processing logic in which at least some aspects of at least one embodiment of the invention may be performed, the organization forming an apparatus for causing an ROB to perform HLD.
Figure 4:
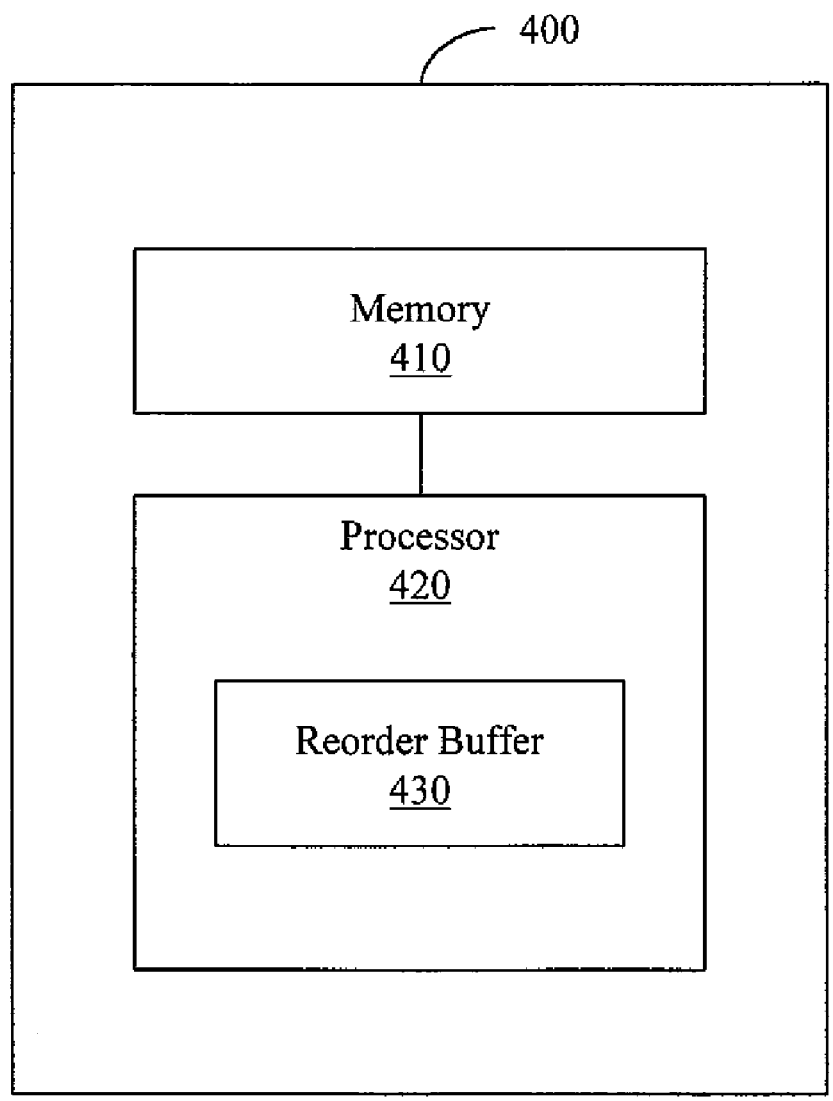
FIG. 4 is a block diagram illustrating an organization of processing logic in which at least some aspects of at least one embodiment of the invention may be performed.

FIG. 3 illustrates an apparatus 320 for controlling a reorder buffer 310 to selectively perform HLD. ROB 310 resides in a processor 300. While apparatus 120 (FIG. 1) and apparatus 220 (FIG. 2) contained several units for controlling ROB 310, apparatus 320 includes a single unit 330 for controlling ROB 310 to selectively perform HLD. While a single unit 330 is illustrated, it is to be appreciated that a greater number of units may be employed. +++++FIG. 4 illustrates a computer system 400 in which at least some aspects of at least one embodiment of the invention may be performed. Thus, computer system 400 may selectively perform HLD. In one embodiment, system 400 includes a memory 410 to store an HLD Instruction and a processor 420 to execute the HLD instruction. The HLD instruction may be provided to computer system 400 on, for example, a bus. The processor 420 may include a reorder buffer 430 that will be controlled to perform the HLD.

To the extent that the term "includes" or "including" is employed in the detailed description or the claims, it Is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". The term "and/or" is used in the same manner, meaning "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store to store one or more of, A, B, and C) it Is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a processor to execute a hardware lock disabling (HLD) instruction and having a reorder buffer (ROB) to retire instructions, wherein the processor includes a unit coupled to the ROB to control the ROB to perform the HLD responsive to the HLD instruction and without use of a speculative versioning cache and a checkpoint register, wherein the unit is to disable a lock when a load store intent (LSI) operation is dispatched and prevent the LSI from issuing a read for ownership and to stall retirement of a lock acquire operation (LAO) until memory accesses of a critical section (CS) are ready for retirement if a lock release instruction has been dispatched.

2. The apparatus of claim 1, wherein the unit is to convert the LAO to a load without a read for ownership, wherein the LAO is associated with the CS entry point.

3. The apparatus of claim 2, wherein the unit is to enable the ROB to perform the HLD based on an HLD prediction flag that indicates that the LAO is a candidate for being disabled, mark the LAO as a predicted CS entry point, set a transaction active flag to indicate that a transaction to be performed in the CS is active, and set a HLD flag to indicate that lock disabling is in progress.

4. The apparatus of claim 1, wherein the unit is to thereafter retire instructions of the CS without retirement of the LAO and the lock release instructions.

5. The apparatus of claim 1, wherein the unit is to cause the ROB to retire the LSI if no lock release instruction has been dispatched.

6. A system comprising:
a memory to store a hardware lock disable (HLD) instruction; and
a processor coupled to the memory and to execute the HLD instruction, the processor including a reorder buffer (ROB) to be controlled to perform HLD in response to the HLD instruction and to be enabled based on a HLD prediction flag to indicate that a lock acquire operation (LAO) is a candidate for being disabled, wherein the ROB is to not retire the LAO and a corresponding lock release operation when it is determined that there is no data collision on a location protected by the LAO and the lock release operation and to mark the LAO as a predicted critical section (CS) entry point, set a transaction active flag to indicate that a transaction to be performed in the CS is active, and to set a HLD flag to indicate that lock disabling is in progress, and the processor is to identify the LAO as a load and store intent (LSI) operation associated with a lock associated with the predicted CS entry point, and to retire the LSI upon determination that the LSI is ready to retire and that no lock release instruction (LRI) related to the LSI has been dispatched, and not retire the LSI and the LRI upon determining that the LSI is ready to retire and that an LRI related to the LSI has been dispatched.

7. The system of claim 6, wherein the ROB is to not retire the LAO and the lock release operation if the lock release operation is dispatched before the LAO is ready to retire.

8. A method comprising:
enabling a reorder buffer (ROB) to disable a lock after identifying a lock acquire operation (LAO) associated with a critical section (CS) entry point, the LAO being a load and store intent (LSI) operation;
identifying the LSI as the CS entry point;
marking the LSI as a predicted CS entry point;

setting a transaction active flag to indicate that a transaction to be performed in the CS is active;

setting a hardware lock disabling (HLD) flag to indicate that lock disabling is in progress;

storing an address associated with the LAO and a value associated with the LAO; and retiring the LSI upon determining that the LSI is ready to retire and that no lock release instruction (LRI) related to the LSI has been dispatched.

9. The method of claim 8, further comprising not retiring the LSI and an LRI related to the LSI if the LSI is ready to retire and the LRI has been dispatched.

10. The method of claim 8, further comprising bulk retiring instructions in the CS and setting a HLD prediction flag to indicate that the LSI should be disabled in the future.

11. The method of claim 8, further comprising disabling the lock responsive to a HLD instruction.

* * * * *